United States Patent
Lee et al.

(10) Patent No.: US 10,235,944 B2
(45) Date of Patent: Mar. 19, 2019

(54) DISPLAY APPARATUS AND METHOD OF DRIVING THE SAME

(71) Applicant: SAMSUNG DISPLAY CO., LTD., Yongin-si, Gyeonggi-do (KR)

(72) Inventors: Dong-Hoon Lee, Hwaseong-si (KR); Hui Nam, Yongin-si (KR); Byung-Sun Kim, Suwon-si (KR); Jae-Hyeon Jeon, Seoul (KR); Myung-Ho Lee, Anyang-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 12 days.

(21) Appl. No.: 15/434,590

(22) Filed: Feb. 16, 2017

(65) Prior Publication Data

US 2017/0330518 A1    Nov. 16, 2017

(30) Foreign Application Priority Data

May 16, 2016 (KR) .................. 10-2016-0059531

(51) Int. Cl.
| | |
|---|---|
| *G09G 3/3291* | (2016.01) |
| *G09G 3/20* | (2006.01) |
| *G09G 5/391* | (2006.01) |
| *G06F 1/3234* | (2019.01) |

(52) U.S. Cl.
CPC ......... *G09G 3/3291* (2013.01); *G09G 3/2003* (2013.01); *G09G 5/391* (2013.01); *G06F 1/3265* (2013.01); *G09G 2300/0443* (2013.01); *G09G 2310/027* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 2008/0030660 | A1* | 2/2008 | Roth | G09G 3/3607 349/106 |
| 2013/0293600 | A1* | 11/2013 | Lee | G09G 3/3258 345/691 |
| 2016/0351118 | A1* | 12/2016 | Knepper | G09G 3/3208 |
| 2017/0256193 | A1* | 9/2017 | Zhou | G09G 3/2003 |

FOREIGN PATENT DOCUMENTS

KR    10-2011-0038915 A    4/2011

* cited by examiner

*Primary Examiner* — Joseph R Haley
(74) *Attorney, Agent, or Firm* — Lee & Morse P.C.

(57) ABSTRACT

A display apparatus includes a display and a controller. The display includes a plurality color sub-pixels, each including an organic light emitting diode and a driving transistor to drive the organic light emitting diode. The driving transistor drives in a saturation region for a normal mode and in a linear region for a standby mode. The controller controls a first portion of preset-color sub-pixels among the color sub-pixels to emit light and a second portion of the preset-color sub-pixels among the color sub-pixels to not emit light in the standby mode.

20 Claims, 11 Drawing Sheets

<NORMAL MODE>

<STANDBY MODE>

DISPLAY APPARATUS AND METHOD OF DRIVING THE SAME

CROSS-REFERENCE TO RELATED APPLICATION

Korean Patent Application No. 10-2016-0059531, filed on May 16, 2016, and entitled, "Display Apparatus and Method of Driving the Same," is incorporated by reference herein in its entirety.

BACKGROUND

1. Field

One or more embodiments described herein relates to a display apparatus and a method for driving a display apparatus.

2. Description of the Related Art

A variety of displays have been developed. Examples include liquid crystal displays, field emission displays, plasma display panels, and organic light emitting displays. An organic light emitting display (OLED) has rapid response speed and low power consumption, mostly because it uses organic light emitting diodes to emit.

SUMMARY

In accordance with one or more embodiments, a display apparatus includes a display including a plurality color sub-pixels, each of the color sub-pixels including an organic light emitting diode and a driving transistor to drive the organic light emitting diode, the driving transistor to drive in a saturation region for a normal mode and in a linear region for a standby mode; and a controller to control a first portion of preset-color sub-pixels among the color sub-pixels to emit light and a second portion of the preset-color sub-pixels among the color sub-pixels to not emit light in the standby mode.

The controller may control a data voltage applied to a preset-color sub-pixel so that the preset color sub-pixel emits light of a high-luminance higher than a normal-luminance corresponding to a white grayscale value in the standby mode. An emission area of the preset color sub-pixel may be the largest among the color sub-pixels. The controller may control the first portion of the preset-color sub-pixels and the second portion of the preset-color sub-pixels to alternately emit light by a preset period in the standby mode.

A first positive power source voltage and a first negative power source voltage may be applied to the driving transistor in the normal mode, the first positive power source voltage and the first negative power source voltage having a first voltage difference, and a second positive power source voltage and a second negative power source voltage may be applied to the driving transistor in the standby mode, the second positive power source voltage and the second negative power source voltage having a second voltage difference less than the first voltage difference.

The controller may process normal-resolution image data to low-resolution image data. The pixel unit of the display may include red, green, and blue sub-pixels, and the preset color sub-pixel may be the blue sub-pixel. The low-resolution image data may include image data of a reference pixel unit which corresponds to pixel units arranged in a 1×2 structure, and the controller may control a blue sub-pixel in a first pixel unit, among the pixel units in the 1×2 structure, to emit blue light and to control a blue sub-pixel in a second pixel unit, among the pixel units in the 1×2 structure, to not emit blue light.

The low-resolution image data may include image data of a reference pixel unit which corresponds to pixel units arranged in a 2×2 structure, and the controller may control blue sub-pixels in a first pixel unit and a fourth pixel unit, among the pixel units in the 2×2 structure, to emit blue light and to control blue sub-pixels in a second pixel unit and a third pixel unit, among the pixel units in the 2×2 structure, to not emit blue light, the first and fourth pixel units in a first diagonal direction and the second and third pixel unit in a second diagonal direction crossing the first diagonal direction.

The pixel unit of the display may include red, first green, second green, and blue sub-pixels, and the preset color sub-pixel may include the first and second green sub-pixels. The low-resolution image data may include image data of a reference pixel unit which corresponds to a plurality of pixel units, and the controller may control the first green sub-pixel in the reference pixel unit to emit green light and to control the second green sub-pixel in the reference pixel unit to not emit green light. The emission area of the preset-color sub-pixel may be the largest among the color sub-pixels.

In accordance with one or more other embodiments, a method for driving a display apparatus including a plurality color sub-pixels, each of the color sub-pixels including an organic light emitting diode and a driving transistor to drive the organic light emitting diode, the method comprising providing a first positive power source voltage and a first negative power source voltage having a first voltage difference to the driving transistor in a normal mode; providing a second positive power source voltage and a second negative power source voltage having a second voltage difference to the driving transistor in a standby mode, the second voltage difference less than the first voltage difference; emitting light from a first portion of preset-color sub-pixels having the largest emission area among the color sub-pixels in the standby mode; and preventing emission of light from a second portion of the preset-color sub-pixels among the color sub-pixels in the standby mode.

The method may include controlling the first portion of the preset-color sub-pixels and the remaining second portion of the preset-color sub-pixels to alternately emit light by a preset period in the standby mode. The method may include processing normal-resolution image data to low-resolution image data. A pixel unit may include red, green, and blue sub-pixels, and an emission area of the blue sub-pixel may be largest among the color sub-pixels.

The low-resolution image data may include image data of a reference pixel unit which corresponds to pixel units arranged in a 1×2 structure, and the method may include controlling a blue sub-pixel in a first pixel unit, among the pixel units in the 1×2 structure to emit blue light, and controlling a blue sub-pixel in a second pixel unit among the pixel units in the 1×2 structure to not emit blue light.

The low-resolution image data may include image data of a reference pixel unit which corresponds to pixel units arranged in a 2×2 structure, and the method may include controlling blue sub-pixels in a first pixel unit and a fourth pixel unit among the pixel units in the 2×2 structure to emit blue light, and controlling blue sub-pixels in a second pixel unit and a third pixel unit among the pixel units in the 2×2 structure to not emit blue light, the first and fourth pixel units arranged in a first diagonal direction and the second and third pixel unit arranged on a second diagonal direction crossing the first diagonal direction.

A pixel unit of the display apparatus may include red, first green, second green, and blue sub-pixels, and an emission area of the first and second green sub-pixels may be the largest among the color sub-pixels. The image data of the low-resolution may include image data of a reference pixel unit which corresponds to a plurality of pixel units, and the method may include controlling the first green sub-pixel in the reference pixel unit to emit green light, and controlling the second green sub-pixel in the reference pixel unit to not emit green light.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
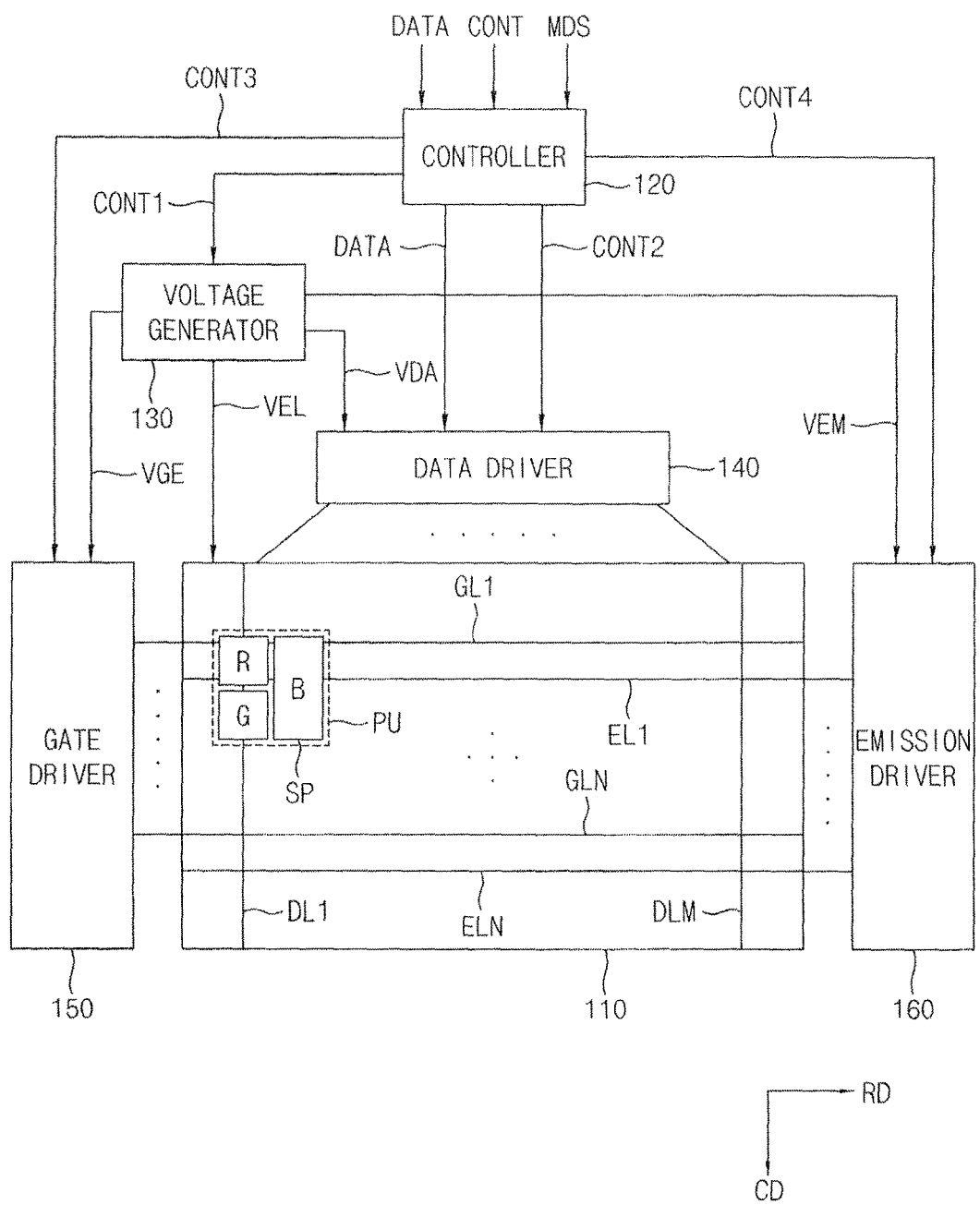
FIG. 1 illustrates an embodiment of a display apparatus.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a display apparatus which may include a display part 110, a controller 120, a voltage generator 130, a data driver 140, a gate driver 150 and an emission driver 160. The display part 110 may include a plurality of pixel units PU, a plurality of gate lines GL1, . . . , GLN, a plurality of emission lines EL1, . . . , ELN and a plurality of data lines DL1, . . . , DLM, where N and M are natural numbers.

The pixel unit PU may include a plurality of color sub-pixels SP. Each of the color sub-pixels SP is connected to a gate line, a data line, and an emission line. The pixel unit PU may include, for example, a red sub-pixel R, a green sub-pixel G and a blue sub-pixel B. As shown in FIG. 1, referring to the pixel unit PU, an emission area of the blue sub-pixel may be larger than emission areas of the red sub-pixel R and the green sub-pixel G. For example, the emission area of the blue sub-pixel B may be similar to the total emission area of the red sub-pixel R and the green sub-pixel G. The emission area of the blue sub-pixel B may be the largest in the pixel unit PU.

The data lines DL1, . . . , DLM may extend in a column direction CD and be arranged in a row direction RD. The data lines DL1, . . . , DLM are connected to the data driver 140 and provide the sub-pixel SP with a data voltage.

The gate lines GL1, . . . , GLN may extend in the row direction RD and be arranged in the column direction CD. The gate lines GL1, . . . , GLN are connected to the gate driver 150 and provide the sub-pixel SP with a gate signal.

The emission lines EL1, . . . , ELN may extend in the row direction RD and be arranged in the column direction CD. The emission lines EL1, . . . , ELN are connected to the emission driver 160 and provide the sub-pixel SP with an emission control signal.

The controller 120 receives image data DATA, a control signal CONT, and a mode signal MDS from an external device. The image data DAT may include red, green, and blue data. The control signal CONT may include a horizontal synchronization signal, a vertical synchronization signal, a main clock signal, etc. The mode signal MDS may control a normal mode signal for driving in a normal mode and a standby mode for driving in a standby mode that is a low-power mode. The standby mode may be, for example, an always-on-display (AOD) mode, which always displays a preset standby image such as a watch image, a weather image, a date image, etc.

The controller 120 processes the image data DATA to a low-resolution lower than a resolution of the display part 110. When in normal mode, the controller 120 processes the image data DATA to normal-resolution image data of the display part 110. The normal-resolution image data of the normal mode may include, for example, a plurality of grayscale data corresponding to a total of 256 grayscales, e.g., a grayscale value of 0 to a grayscale value of 255.

When in the standby mode, the controller 120 processes the image data DATA to low-resolution image data having a low-resolution lower than a resolution of the display part 110. The low-resolution image data may include, for example, only white data and black data corresponding to the grayscale value of 255 and the grayscale value of 0, respectively. For example, the controller 120 may process normal-resolution image data corresponding to a plurality of pixel units arranged in a (P×Q) structure to the low-resolution image data corresponding to a plurality of reference pixel units arranged in a (I×J) structure. The reference pixel unit includes a plurality of pixel units, for example where P, Q, I, and J are natural numbers and where I<P and J<Q.

When the low-resolution image data corresponding to the plurality of reference pixel units are black data, the controller 120 may control the data driver 140 to provide the plurality of color sub-pixels in the plurality of reference pixel units with black data.

When the low-resolution image data corresponding to the reference pixel units are white data, the controller 120 may control the data driver 140 to provide a first portion of preset color sub-pixels, among the color sub-pixels in the reference pixel units, with the white data and to provide a remaining second portion of preset color sub-pixels, among the color sub-pixels in the reference pixel units, with the black data. The preset color sub-pixel may be the color sub-pixel having the largest emission area in the pixel unit. In addition, the controller 120 may control the data driver 140 to provide other color sub-pixels except the preset color sub-pixels in the reference pixel units with the white data.

In addition, the controller 120 may control the data driver 140 to provide the first portion of the preset color sub-pixels with a white voltage corresponding to a high-luminance higher than a normal-white luminance, so that the first portion of the preset color sub-pixels emit light of the high-luminance.

For example, the controller 120 may control the data driver 140 to provide a first portion of blue sub-pixels, among red, green, and blue sub-pixels in the reference pixel units, with the white data and provide blue color sub-pixels of a remaining second portion of blue sub-pixels, among the red, green, and blue sub-pixels in the reference pixel units, with the black data. In addition, the controller 120 may control the data driver 140 to provide red and green sub-pixels, except to the blue sub-pixels among the red, green, and blue sub-pixels in the reference pixel units, with the white data. In addition, the controller 120 may control the data driver 140 to provide the first portion of the blue sub-pixels with a white voltage corresponding to a high-luminance higher than a normal-white luminance, so that the first portion of the blue sub-pixels may emit blue-light of the high-luminance.

According to the exemplary embodiment, when the low-resolution image data corresponding to the reference pixel units are white data in standby mode, the first portion of a plurality of color sub-pixels which has the largest emission area may emit the light and the second portion of the color sub-pixels which has the largest emission area may not emit light. In addition, the first portion of the color sub-pixels may emit the light of the high luminance.

Therefore, the display part 110 may control a total emission area and a current density of the red, green, and blue sub-pixels in standby mode. Thus, a white color coordinate in standby mode may substantially equal to a white color coordinate in the normal mode.

The controller 120 may generate a voltage control signal CONT1 for driving the voltage generator 130, a data control signal CONT2 for driving the data driver 140, a gate control signal CONT3 driving the gate driver 150, and an emission control signal CONT4 for driving the emission driver 160 based on the control signal CONT.

The voltage generator 130 may generate a driving voltage corresponding to the normal mode signal and the standby mode signal based on the voltage control signal CONT1.

The voltage generator 130 may generate a plurality of driving voltages for driving the display apparatus using an input voltage. The driving voltages may include a display driving voltage VEL for driving the display part 110, a data driving voltage VDA for driving the data driver 140, a gate driving voltage VGE for driving the gate driver 150, and an emission driving voltage VEM for driving the emission driver 160.

The display driving voltage VEL may include a first positive power source voltage ELVDD1, a first negative power source voltage ELVSS1, a second positive power source voltage ELVDD2, and a second negative power source voltage ELVSS2.

In normal mode, the first positive power source voltage ELVDD1 and the first negative power source voltage ELVSS1 are applied to the display part 110. The first positive power source voltage ELVDD1 and the first negative power source voltage ELVSS1 have a first voltage difference between each other.

In standby mode, the second positive power source voltage ELVDD2 and the second negative power source voltage ELVSS2 are applied to the display part 110. The second positive power source voltage ELVDD2 and the second negative power source voltage ELVSS2 have a second voltage difference less than the first voltage difference between each other.

The data driving voltage VDA may include a red white voltage and a red black voltage for driving a red sub-pixel, a green white voltage and a green black voltage for driving a green sub-pixel, and a blue white voltage and a blue black voltage for driving the blue sub-pixel. The white voltage is a data voltage corresponding to a white grayscale value of 255, and the black voltage is a data voltage corresponding to a black grayscale value of 0, with respect to a total of 256 grayscale values.

In normal mode, a plurality of red data voltages corresponding to a plurality of red grayscale values is generated using the red white voltage and the red black voltage. A plurality of green data voltages corresponding to a plurality of green grayscale values is generated using the green white voltage and the green black voltage. A plurality of blue data voltages corresponding to a plurality of blue grayscale values is generated using the blue white voltage and the blue black voltage. Thus, a normal image is displayed on the display apparatus in normal mode.

In standby mode, the red sub-pixel emits red light based on the red white voltage and does not emit red light based on the red black voltage. The green sub-pixel emits green light based on the green white voltage and does not emit green light based on the second green black voltage. The blue sub-pixel emits blue light based on the blue white voltage and does not emit blue light based on the blue black voltage. The red, green, and blue white voltages may be determined to a same level or difference levels according to a white color coordinate.

According to the exemplary embodiment, in standby mode, a white voltage applied to the preset color sub-pixel which has the largest emission area in the pixel unit may have a high-luminance higher than a normal-luminance corresponding to a normal white grayscale value. A white voltage applied to other color sub-pixel, except for the preset color sub-pixel in the pixel unit, may have normal-luminance. For example, when the driving transistor driving the sub-pixel is a PNP transistor and a blue white voltage corresponding to normal luminance is about 3V, a blue white voltage of the high-luminance according to the exemplary embodiment may be about 2.7V, to increase the current density applied to the organic light emitting diode in standby mode. Thus, the blue sub-pixel may emit the blue-light of the high luminance in standby mode.

The gate driving voltage VGE and the emission driving voltage VEM may respectively include a high voltage and a low voltage for generating the gate signal and the emission control signal.

The data driver 140 may convert the image data to the data voltage based on the data control signal CONT2 and may provide the data lines DL1, ..., DLM with the data voltage. In normal mode, the data driver 140 may generate the red, green, and blue grayscale data corresponding to red, green, and blue grayscale data using the red, green, and blue black voltages and the red, green, and blue white voltage, and may provide the data lines DL1, ..., DLM with the red, green, and blue grayscale data. In standby mode, the data driver 140 may provide the data lines DL1, ..., DLM to the red, green, and blue white voltage and the red, green, and blue black voltage corresponding to the red, green, and blue white data and the red, green, and blue black data.

The gate driver 150 may generate a plurality of gate signals having the high voltage and low voltage based on the gate control signal CONT3, and may provide the gate lines GL1, ..., GLN with the gate signals.

The emission driver 160 may generate a plurality of emission control signals having the high voltage and low voltage based on the emission control signal CONT, and may provide the emission lines EL1, ..., ELN with the emission control signals.

Figure 2:
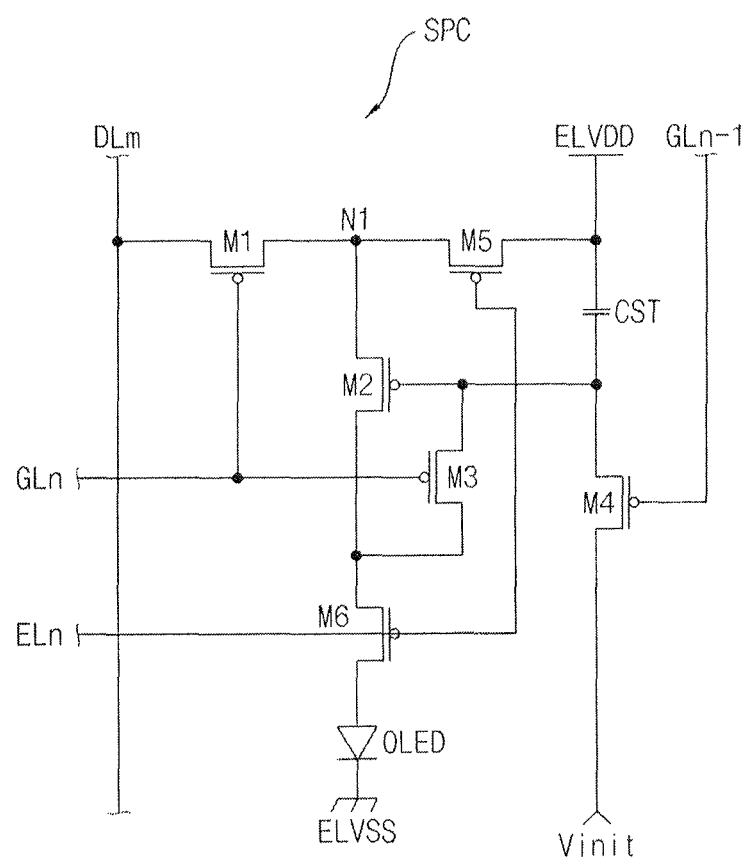
FIG. 2 illustrates an embodiment of a pixel circuit.

FIG. 2 illustrates an embodiment of a pixel circuit SPCC which may include first to sixth transistors M1 to M6 and a storage capacitor CST. According to the exemplary embodiment, the first to sixth transistors M1 to M6 may be PNP transistors. In another embodiment, the first to sixth transistors M1 to M6 may be NPN transistors.

The first transistor M1 includes a control electrode connected to an n-th gate line GLn, a first electrode connected to an m-th data line DLm, and a first node N1 connected to a second electrode. When the n-th gate signal is received, the first transistor M1 turns on and a data signal of the m-th data line DLm is applied to the first node N1.

The second transistor M2 includes a control electrode connected to the storage capacitor CST, a first electrode connected to the first node N1, and a second electrode connected to the sixth transistor M6. The second transistor M2 may provide the organic light emitting diode OLED with a current corresponding to a voltage charged in the storage capacitor CST.

The third transistor M3 includes a control electrode connected to the n-th gate line GLn, a first electrode connected to second electrode of the second transistor M2, and a second electrode connected to the control electrode of the second transistor M2. When the n-th gate signal is received, the third transistor M3 turns on and the second transistor M2 is in a diode-connected state.

The fourth transistor M4 includes a control electrode connected to an (n−1)-th gate line GLn−1, a first electrode connected to a first electrode of the storage capacitor CST and the control electrode of the first transistor M1, and a second electrode receiving an initial voltage Vinit. When the (n−1)-th gate signal is received, the fourth transistor M4 turns on and the first electrode of the storage capacitor CST and the control electrode of the first transistor M1 receive the initial voltage Vinit.

The fifth transistor M5 includes a control electrode connected to the n-th emission line ELn, a first electrode receiving a positive power source voltage ELVDD, and a second electrode connected to the first node N1. When the n-th emission control signal is received, the fifth transistor M5 turns on and the first node N1 receives the positive power source voltage ELVDD.

The sixth transistor M6 includes a control electrode connected to the n-th emission line ELn, a first electrode connected to the second transistor M2, and a second electrode connected to an anode electrode of the organic light emitting diode OLED. The cathode electrode of the organic light emitting diode OLED receives a negative power source voltage ELVSS. When the n-th emission control signal is received, the sixth transistor M6 turns on and the organic light emitting diode OLED receives the current through the second transistor M2.

The second transistor M2 is driven as a constant-current source in normal mode. Thus, the current corresponding to a data voltage charged in the storage capacitor CST is applied to the organic light emitting diode OLED. However, the second transistor M2 is driven as a switch in standby mode. Thus, the second transistor M2 turns on or off to control an emission or a non-emission of the organic light emitting diode OLED.

Figure 3:
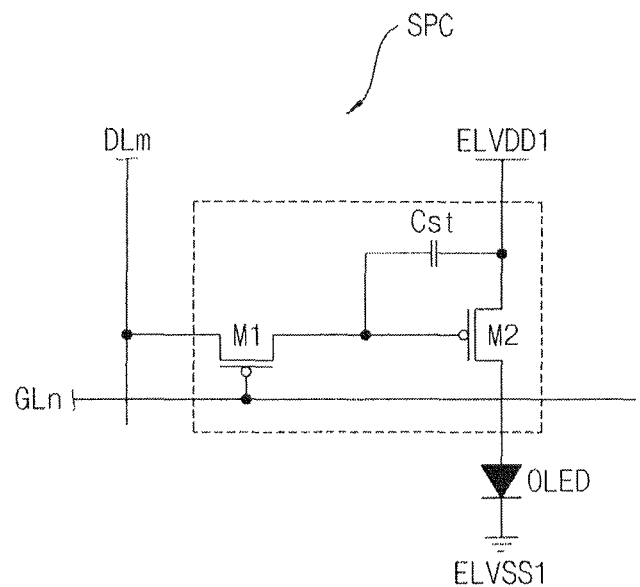
FIG. 3 illustrates an embodiment for driving a pixel circuit in normal mode.
Figure 4:
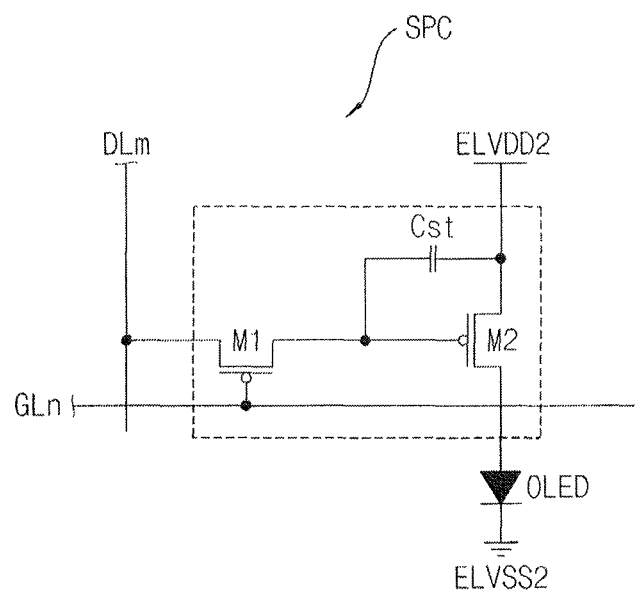
FIG. 4 illustrates an embodiment for driving the pixel circuit in standby mode.
Figure 5:
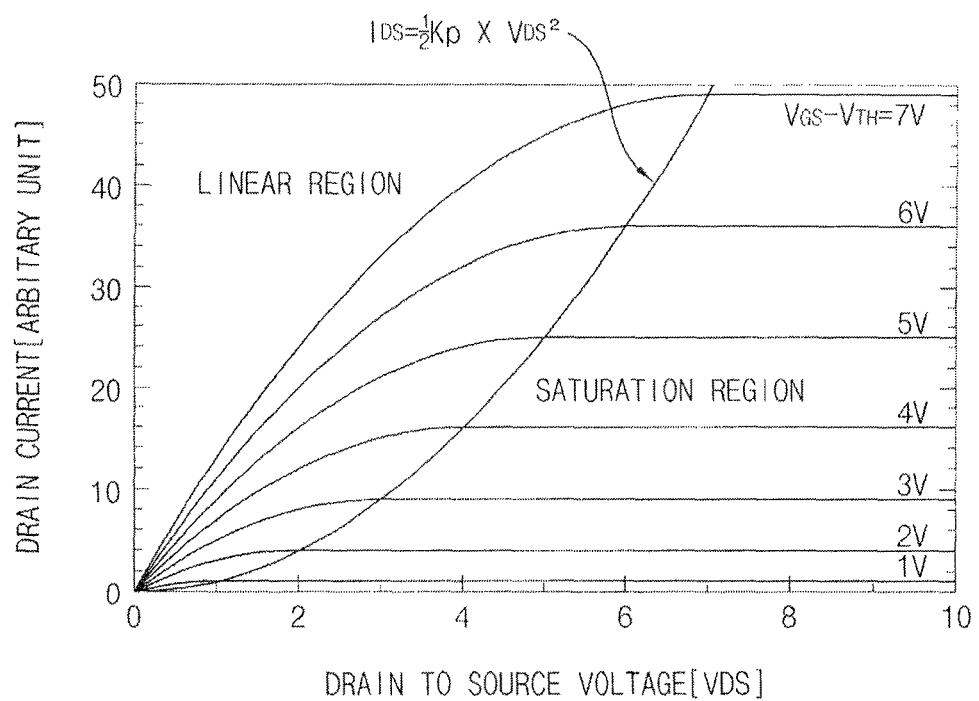
FIG. 5 illustrates an example of performance characteristics of a driving transistor of the pixel circuit.
Figure 6:
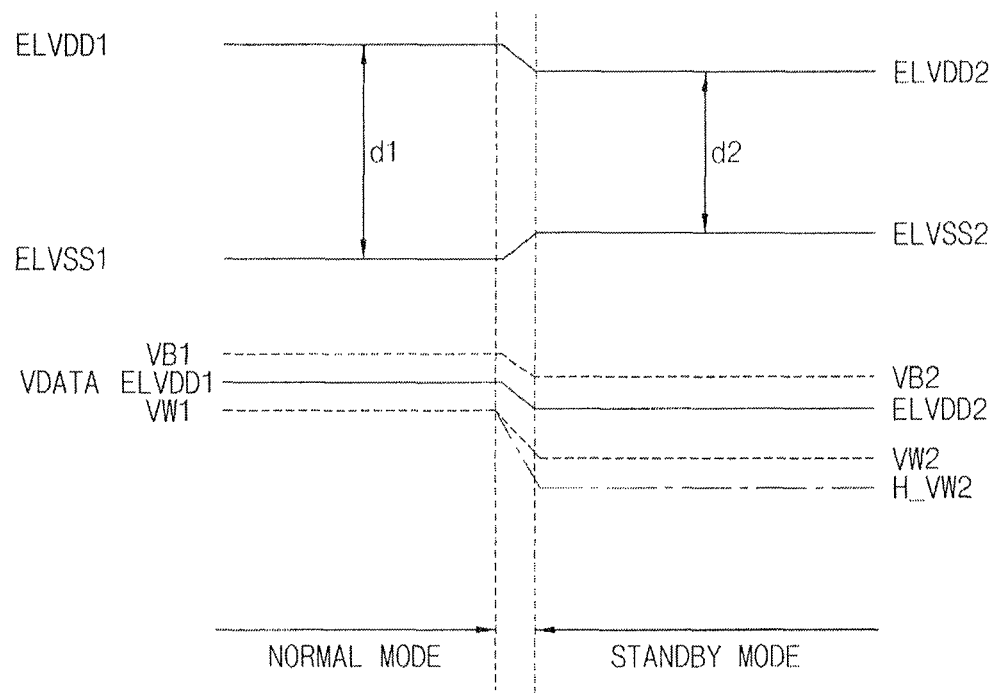
FIG. 6 illustrates driving voltages for the pixel circuit in normal and standby modes.

FIG. 3 illustrates an embodiment for driving a pixel circuit SPC in normal mode. FIG. 4 illustrates an embodiment for driving the pixel circuit SPC in standby mode. FIG. 5 illustrates an example of performance characteristics of a driving transistor of the pixel circuit. FIG. 6 illustrates voltages for driving the pixel circuit in normal mode and standby mode.

The pixel circuit SPC may include a first transistor M1, a storage capacitor CST, a second transistor M2, and an organic light emitting diode OLED. The second transistor M2 is a driving transistor for driving the organic light emitting diode OLED.

Referring to FIGS. 3, 4, and 6, the pixel circuit P receives a first positive power source voltage ELVDD1 and a first negative power source voltage ELVSS1, which have a first voltage difference, in normal mode. The first positive power source voltage ELVDD1 is applied to a source electrode of the second transistor M2 and the first negative power source voltage ELVSS1 is applied to a cathode electrode of the organic light emitting diode OLED, connected to a drain electrode of the second transistor M2. A source/drain voltage VDS of the second transistor M2 corresponds to the first voltage difference d1 between the first positive power source voltage ELVDD1 and the first negative power source voltage ELVSS1.

Referring to FIG. 5, the second transistor M2 of the driving transistor may drive in a saturation region or in a linear region according to the source/drain voltage VDS and a gate/source electrode VGS. In normal mode, the first positive power source voltage ELVDD1 and first negative power source voltage ELVSS1 may drive the second transistor M2 in the saturation region. When the second transistor M2 is driven in the saturation region, a data voltage VDATA applied to the data line DLm is charged in the storage capacitor CST.

According to normal mode, the data voltage VDATA may include a plurality of data voltages corresponding to a plurality of grayscale values generated based on the first white voltage VW1 and the first black voltage VB1. The data voltage VDATA is applied to the data line DLm.

A current corresponding to the data voltage VDATA charged in the storage capacitor CST is applied to the organic light emitting diode OLED. Thus, the organic light emitting diode OLED may emit light with a luminance corresponding to the grayscale data. However, in standby mode, the pixel circuit SPC receives the second positive power source voltage ELVDD2 and the second negative power source voltage ELVSS2.

Referring to FIGS. 4, 5, and 6, in standby mode, the pixel circuit P receives a second positive power source voltage ELVDD2 and a second negative power source voltage ELVSS2, which differ by a second voltage difference d2 that is smaller than the first voltage difference d1. The second positive power source voltage ELVDD2 and the second negative power source voltage ELVSS2 are determined based on a source/drain voltage VDS of the second transistor M2, to drive the second transistor M2 of the driving transistor in the linear region.

The data voltage VDATA applied to the data line Dm includes the second white voltage VW2 for turning-on the second transistor M2 and the second black voltage VB2 for turning-off the second transistor M2. The second white voltage VW2 in standby mode may be equal to or different from the first white voltage VW1 in normal mode. The second black voltage VB2 in standby mode may be equal to or different from the first black voltage VB1 in normal mode.

In standby mode, when the first transistor M1 turns on based on the n-th gate signal applied to the n-th gate line GLn and the second white voltage VW2 is applied to the data line DLm, the second transistor M2 is driven in the linear region and turns on based on the second white voltage VW2 of the data line DLm and current corresponding to the second white voltage VW2 is applied to the organic light emitting diode OLED. The organic light emitting diode OLED may emit light, e.g., may emit light corresponding to a white grayscale value.

Then, when the first transistor M1 turns on based on the n-th gate signal applied to the n-th gate line GLn and the second black voltage VB2 is applied to the data line DLm, the second transistor M2 is driven in the linear region and turns off based on the second black voltage VB2 of the data line DLm. The organic light emitting diode OLED may not emit light, e.g., displays a black grayscale value.

According to the exemplary embodiment, in standby mode, the voltage level of the second white voltage H_VW2 applied to the preset color sub-pixel of the largest emission area may be controlled to drive the preset color sub-pixel with a high-luminance higher than a normal-luminance. When the driving transistor is a PNP type, the voltage level of the second white voltage H_VW2 may be controlled to be lower than a voltage level of a normal white voltage. However, when the driving transistor is an NPN type, the voltage level of the second white voltage H_VW2 may be controlled to be higher than the voltage level of the normal white voltage. The voltage level of the second white voltage VW2 applied to the remaining color sub-pixel, except for the preset color sub-pixel having the largest emission area, may be the voltage level of the normal white voltage.

For example, the second white voltage H_VW2 applied to the blue sub-pixel having the largest emission area may be controlled to be about 2.7V lower than about 3V of the normal white voltage corresponding to a blue-light. In addition, the second white voltage H_VW2 applied to the remaining red sub-pixel may be determined to about 2.5V of the normal white voltage corresponding to a red-light and the second white voltage H_VW2 applied to the remaining green sub-pixel may be determined to about 2V of the normal white voltage corresponding to green light.

According to the exemplary embodiment, the first portion of the preset color sub-pixels having the largest emission area may emit light of the high-luminance and the second portion of the preset color sub-pixels may not emit the light in standby mode. Thus, the white color coordinate may substantially equal to the white color coordinate in normal mode.

Figure 7:
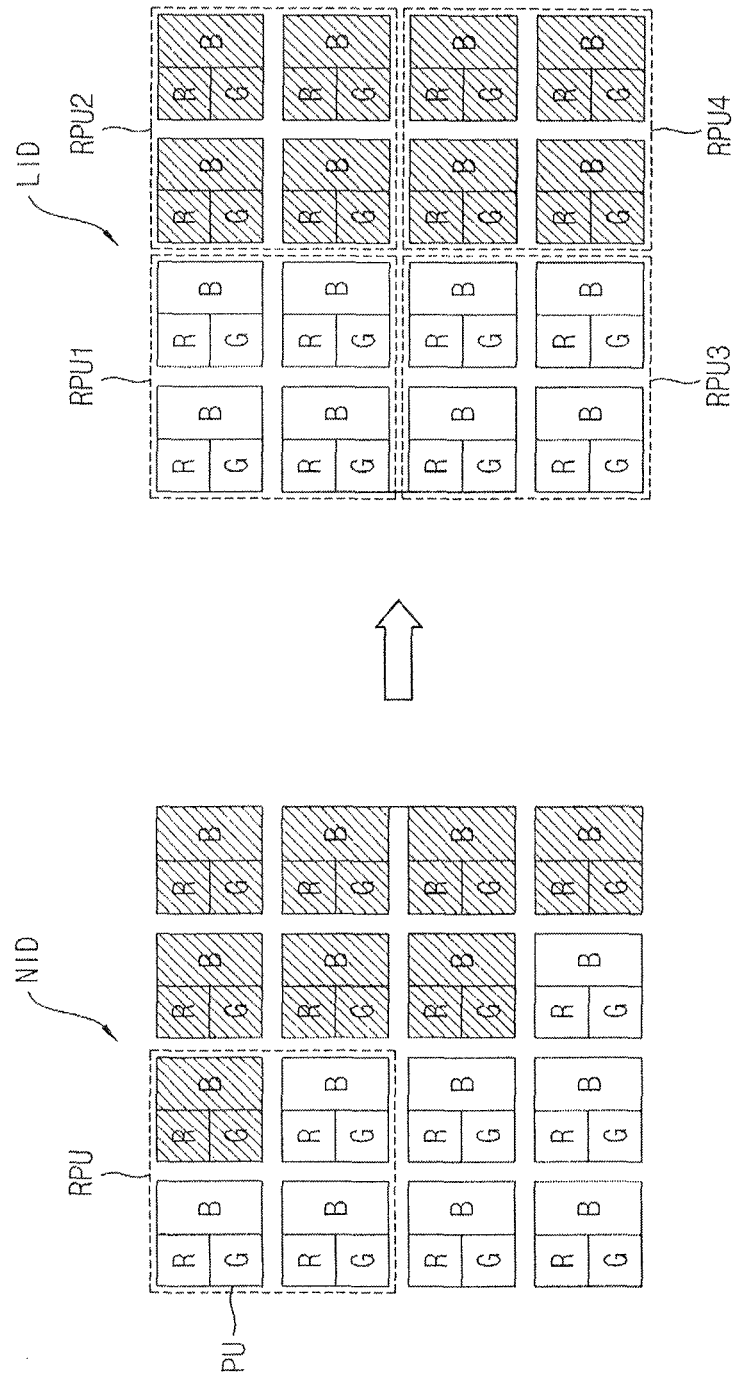
FIG. 7 illustrates an embodiment of a method for processing image data in standby mode.
Figure 8:
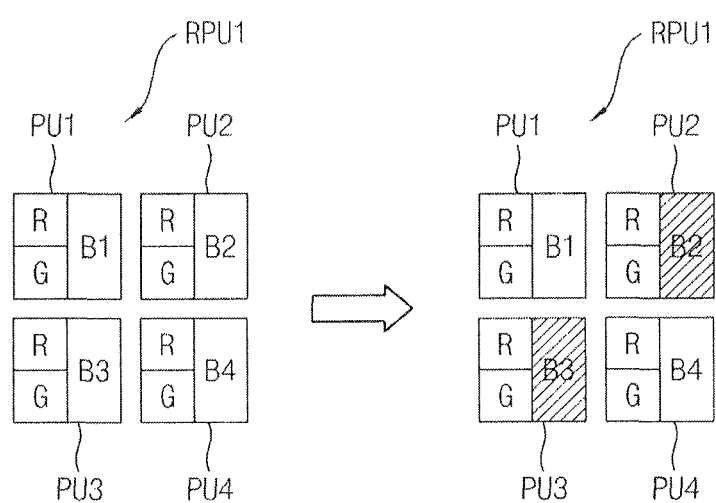
FIG. 8 illustrates an embodiment for driving a display part in standby mode.

FIG. 7 illustrates an embodiment of a method for processing image data in standby mode. FIG. 8 illustrates an embodiment for driving the display part in standby mode.

Referring to FIGS. 1 and 7, the controller 120 receives standby image data NID in standby mode. The standby image data NID may include only white and black grayscale data and may be normal-resolution image data.

The controller 120 processes the standby image data NID to low-resolution image data LID. As shown in FIG. 7, the controller 120 processes the standby image data NID to the low-resolution image data LID for a reference pixel unit RPU corresponding to pixel units in 2×2 structure. The low-resolution image data LID may include white data corresponding to a first reference pixel unit RPU1, black data corresponding to a second reference pixel unit RPU2, white data corresponding to a third reference pixel unit RPU3, and black data corresponding to a fourth reference pixel unit RPU4.

The controller 120 controls red, green, and blue sub-pixels R, G, and B in the second and fourth reference pixel units RPU2 and RPU4 to not emit the light. As a result, the second and fourth reference pixel units RPU2 and RPU4 display a black grayscale value.

However, referring to FIG. 8, the controller 120 controls a first portion of the blue sub-pixels having the largest emission area, among the red, green, and blue sub-pixels R, G, and B in the first and third reference pixel units RPU1 and RPU3 corresponding to the white data, to emit a blue-light and to control a remaining second portion of blue sub-pixels to not emit the blue-light.

For example, the first reference pixel unit RPU1 includes a first pixel unit PU1, a second pixel unit PU2, a third pixel unit PU4 and a fourth pixel unit PU4. Each of the first to fourth pixel units PU1 to PU4 includes the red, green, and blue sub-pixels R, G, and B. The blue sub-pixel has the largest emission area, and may correspond to a total emission area of the red and green sub-pixels. The controller 120 controls the blue sub-pixels B1 and B4 in the first and fourth pixel units PU1 and PU4 in a first diagonal direction, among the pixel units PU1 to PU4 in the 2×2 structure in the reference pixel unit, to emit the blue-light.

The controller 120 controls the blue sub-pixel B2 and B3 in the second and third pixel units PU2 and PU3 in a second diagonal direction crossing the first diagonal direction, among the pixel units PU1 to PU4 in the 2×2 structure in the reference pixel unit, to not emit the blue-light.

The first and fourth pixel units PU1 and PU4 in the first diagonal direction emit blue light and the second and third pixel units PU2 and PU3 in the second diagonal direction do not emit blue light. In one embodiment, the first and third pixel units PU1 and PU3 in a first vertical direction may emit blue light and the second and fourth pixel units PU2 and PU4 in a second vertical direction parallel to the first vertical direction may not emit blue light. Alternatively, the first and second pixel units PU1 and PU2 in a first horizontal direction may emit blue light and the third and fourth pixel units PU3 and PU4 in a second horizontal direction parallel to the first horizontal direction may not emit blue light.

In one embodiment, the reference pixel unit may include a first pixel unit and a second pixel unit arranged in a 1×2 structure. Each of the first and second pixel units may include red, green, and blue sub-pixels R, G, and B. The controller 120 may control a blue sub-pixel B in the first pixel unit PU1 to emit the blue light and to control the blue sub-pixel B in the second pixel unit to not emit blue light. In addition, the controller 120 may control the voltage generator 130 to provide the blue sub-pixel with a blue white voltage for a high-luminance in standby mode.

Therefore, the first portion of the preset color sub-pixels having the largest emission area may emit the light of the high-luminance and the second portion of the preset color sub-pixels may not emit the light in standby mode. Thus, the white color coordinate may substantially equal the white color coordinate in normal mode.

Figure 9:
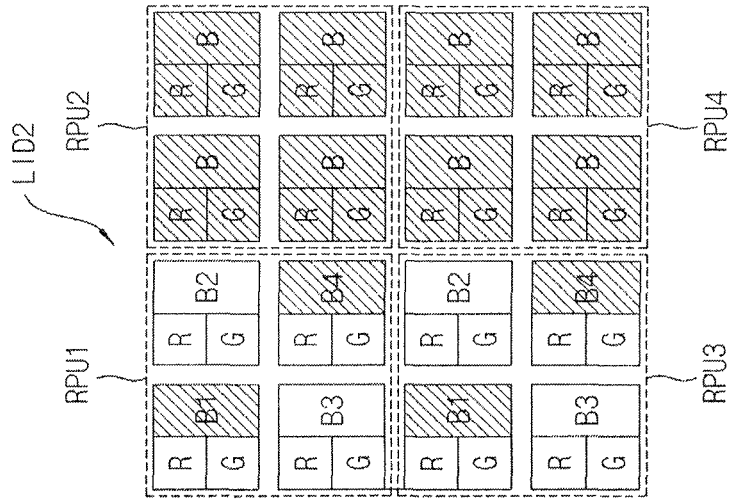
FIG. 9 illustrates an embodiment for driving a display part in a standby mode.
Figure 9:
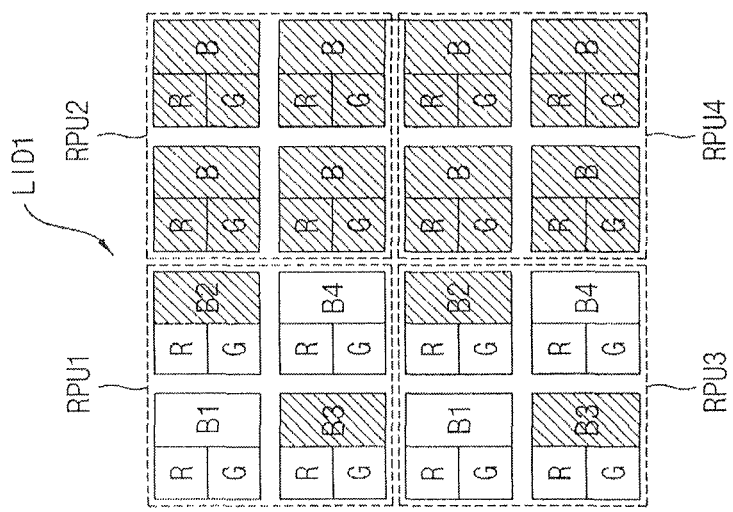

FIG. 9 illustrates an embodiment for driving of a display part in standby mode. Referring to FIGS. 1 and 9, in standby mode, the controller 120 may control the data driver 140 to alternately display a first low-resolution image data LDI1 and a second low-resolution image data LDI2 on the display part 110 by a preset period T. The preset period T may be about one minute.

The first low-resolution image data LDI1 may include white data corresponding to a first reference pixel unit RPU1, black data corresponding to a second reference pixel unit RPU2, white data corresponding to a third reference pixel unit RPU3, and black data corresponding to a fourth reference pixel unit RPU4.

For the first and third reference pixel units RPU1 and RPU3 corresponding to the white data, the blue sub-pixels B1 and B4 in the first and fourth pixel units are determined to the white data to emit a blue light, and the blue sub-pixels B2 and B3 in the second and third pixel units are determined to the black data to not emit blue light.

The second low-resolution image data LDI2 may include the white data corresponding to a first reference pixel unit RPU1, the black data corresponding to a second reference pixel unit RPU2, the white data corresponding to a third reference pixel unit RPU3, and the black data corresponding to a fourth reference pixel unit RPU4.

For the first and third reference pixel units RPU1 and RPU3 corresponding to the white data, the blue sub-pixels B1 and B4 in the first and fourth pixel units are determined to the black data to not emit blue light, and the blue sub-pixels B2 and B3 of the second and third pixel units are determined to the white data to emit blue light.

According to the exemplary embodiment, emitting color sub-pixels and non-emitting color sub-pixels are alternately driven by the preset period. Thus, the color sub-pixel may be prevented from being damaged as a result of being driving for long hours.

Figure 10:
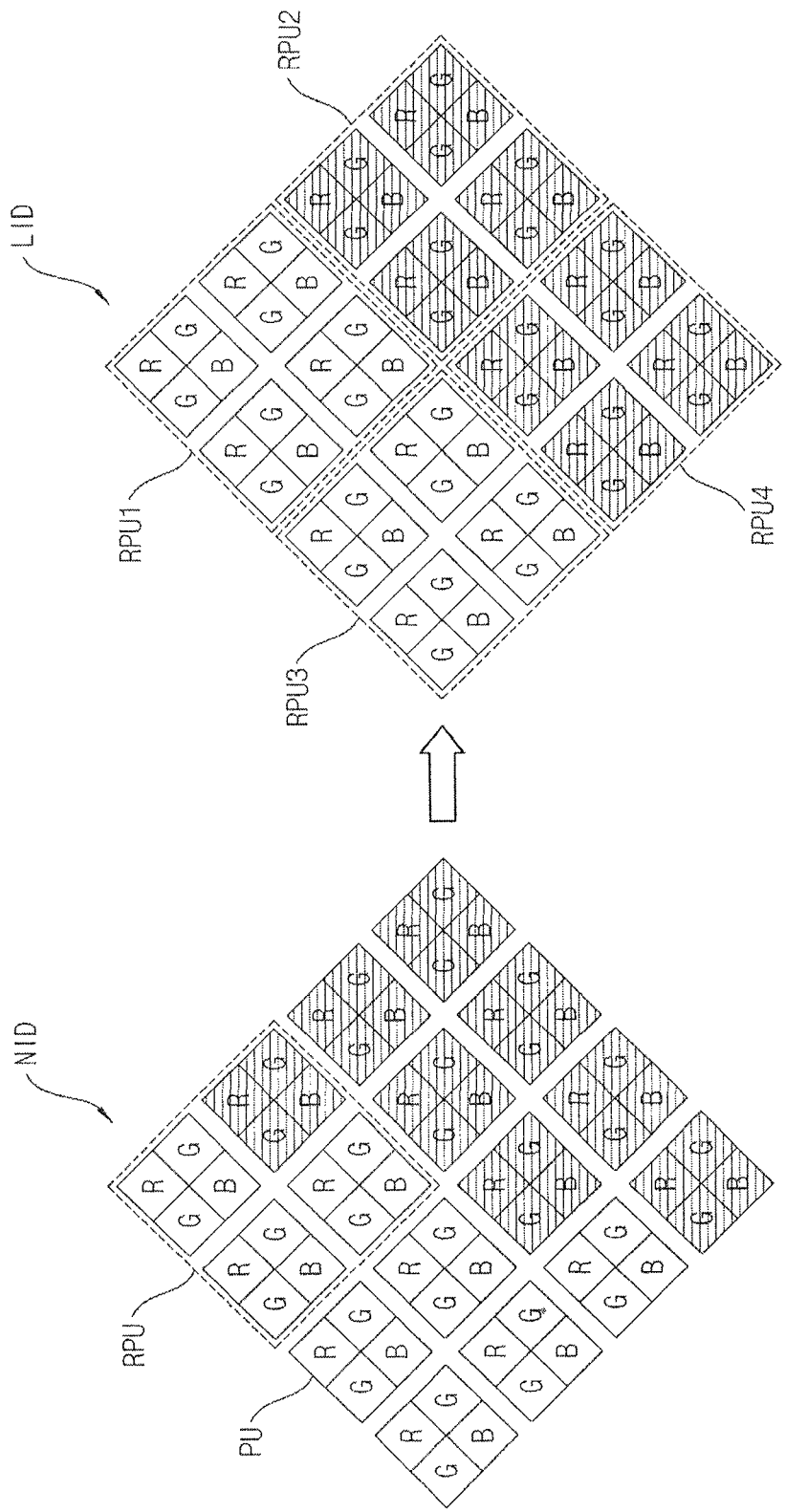
FIG. 10 illustrates another embodiment of a method for processing image data in standby mode.
Figure 11:
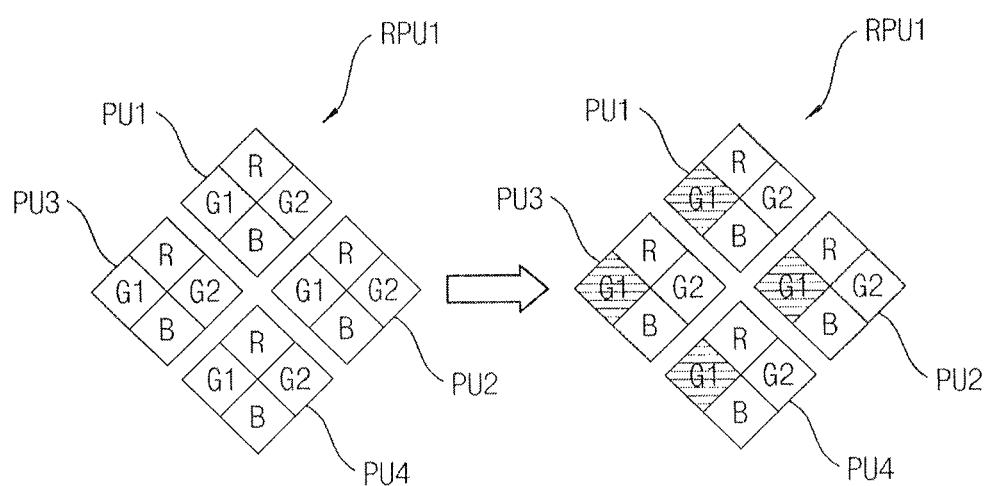
FIG. 11 illustrates an embodiment for driving a display part in standby mode.

FIG. 10 illustrates an embodiment of a method for processing image data in standby mode. FIG. 11 illustrates another embodiment for driving of a display part in standby mode. Referring to FIG. 10, the display part may include a plurality of pixel units PU. The pixel unit PU has a pen-tile structure including a red sub-pixel R, a blue sub-pixel B, and two green sub-pixels G1 and G2. An emission area of first and second green sub-pixels G1 and G2 may be larger than an emission area of each of the red sub-pixel and blue sub-pixels. An emission area of the first and second green sub-pixels G1 and G2 are largest in the pixel unit PU.

Referring to FIGS. 1 and 10, the controller 120 receives standby image data in standby mode. The standby image data NID may include only white and black grayscale data and may be normal-resolution image data. The controller 120 may process the standby image data NID to low-resolution image data LID.

As shown in FIG. 10, the controller 120 processes the standby image data NID to the low-resolution image data LID, which include a reference pixel unit RPU corresponding to pixel units arranged in a 2×2 structure. The low-resolution image data LID may include white data corresponding to a first reference pixel unit RPU1, black data corresponding to a second reference pixel unit RPU2, white data corresponding to a third reference pixel unit RPU3, and black data corresponding to a fourth reference pixel unit RPU4.

The controller 120 controls red, first green, second green, and blue sub-pixels R, G1, G2, and B in the second and fourth reference pixel units RPU2 and RPU4 to not emit light, such that the second and fourth reference pixel units RPU2 and RPU4 display a black grayscale value.

However, referring to FIG. 11, the controller 120 controls a first portion of the green sub-pixels G1 and G2 having the largest emission area among the red, first green, second green, and blue sub-pixels R, G1, G2, and B in the first and third reference pixel units RPU1 and RPU3 corresponding to the white data, to emit green light. The controller 120 controls a remaining second portion of the green sub-pixels G1 and G2, among the red, first green, second green, and blue sub-pixels R, G1, G2, and B in the first and third reference pixel units RPU1 and RPU3, to not emit green light.

For example, the controller 120 controls the second green sub-pixels G2 of the first to fourth pixel units PU1 to PU4 to emit green light and to control the first green sub-pixels G1 of the first to fourth pixel units PU1 to PU4 to not emit green light.

Therefore, the first portion of the preset color sub-pixels having the largest emission area may emit light of the high-luminance and the second portion of the preset color sub-pixels may not emit light in standby mode. Thus, the white color coordinate may substantially equal the white color coordinate in normal mode.

Figure 12:
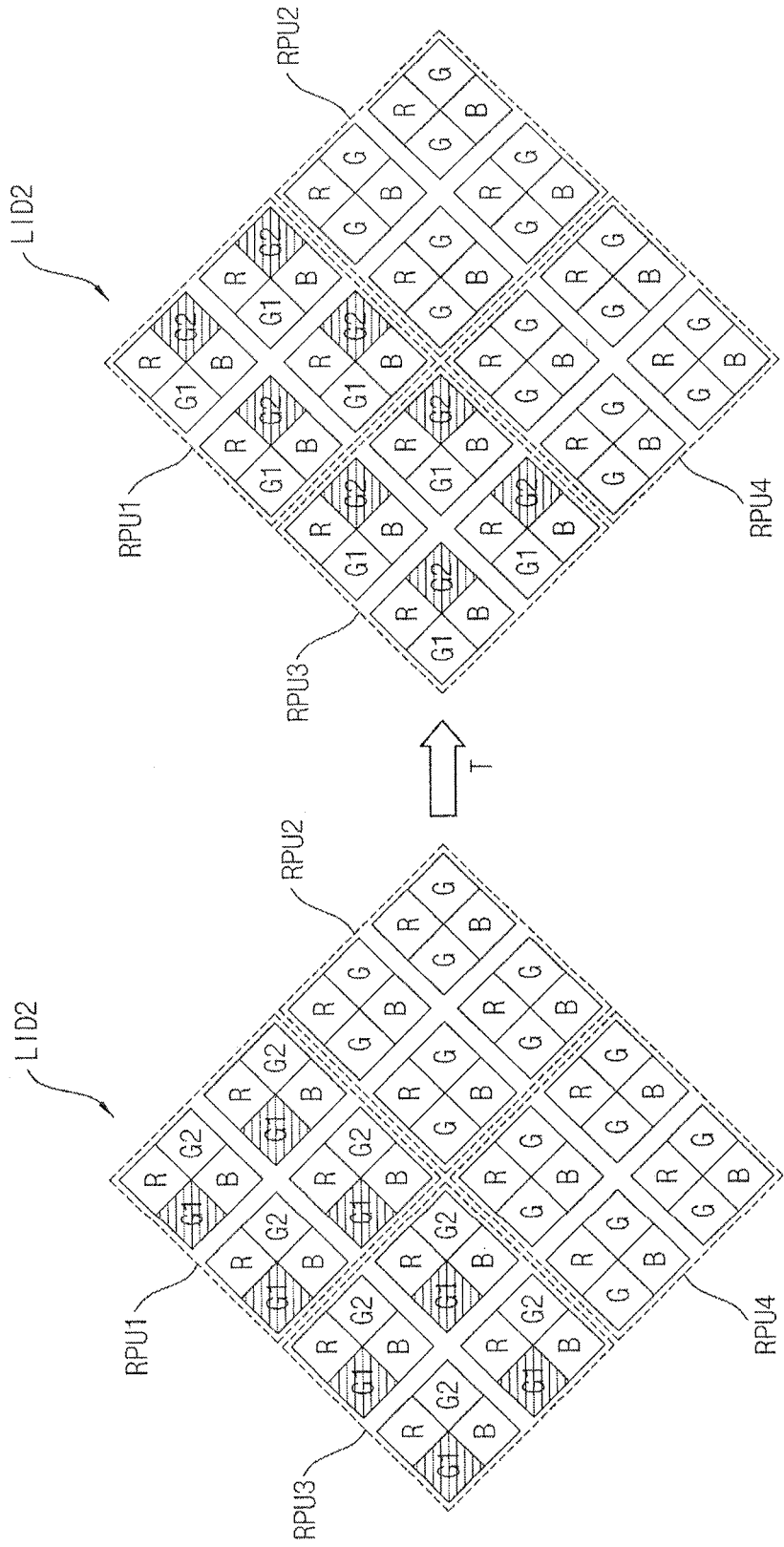
FIG. 12 illustrates an embodiment for driving a display part in standby mode.

FIG. 12 illustrates another embodiment for driving a display part in standby mode. Referring to FIGS. 1 and 12, in standby mode, the controller 120 may control the data driver 140 to alternately display a first low-resolution image data LDI1 and a second low-resolution image data LDI2 on the display part 110 by a preset period T. The preset period T may be, for example, about one minute.

The first low-resolution image data LDI1 may include white data corresponding to a first reference pixel unit RPU1, black data corresponding to a second reference pixel unit RPU2, white data corresponding to a third reference pixel unit RPU3, and black data corresponding to a fourth reference pixel unit RPU4.

For the first and third reference pixel units RPU1 and RPU3 corresponding to white data, the second green sub-pixels G2 of the first to fourth pixel units are determined to white data to emit the green light and the first green sub-pixels G1 of the first to fourth pixel units are determined to the black data to not emit green light.

The second low-resolution image data LDI2 may include the white data corresponding to a first reference pixel unit RPU1, the black data corresponding to a second reference pixel unit RPU2, the white data corresponding to a third reference pixel unit RPU3, and the black data corresponding to a fourth reference pixel unit RPU4.

For the first and third reference pixel units RPU1 and RPU3 corresponding to white data, the first green sub-pixels G1 of the first to fourth pixel units are determined to the white data to emit green light and the second green sub-pixels G2 of the first to fourth pixel units are determined to the black data to not emit green light.

According to the exemplary embodiment, emitting color sub-pixels and non-emitting color sub-pixels are alternately driven by the preset period. Thus, color sub-pixels may be prevented from being damaged by being driven for long hours.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, drivers, and other processing features of the embodiments disclosed herein may be implemented in logic which, for example, may include hardware, software, or both. When implemented at least partially in hardware, the controllers, drivers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, drivers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned exemplary embodiments, a first portion of the preset color sub-pixels may emit light of the high-luminance and the second portion of the preset color sub-pixels may not emit light in standby mode. Thus, the white color coordinate is substantially equal to the white color coordinate in normal mode. In addition, the first portion of the color sub-pixels having the largest emission area may emit light of the high-luminance and the second portion of the color sub-pixels may not emit light in standby mode. Thus, the white color coordinate is substantially equal to the white color coordinate in normal mode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
   a display including a plurality of color sub-pixels, each of the plurality of color sub-pixels including an organic light emitting diode and a driving transistor to drive the organic light emitting diode, the driving transistor to drive in a saturation region for a normal mode and in a linear region for a standby mode in which a standby image is displayed, the standby image including a white grayscale and a black grayscale; and
   a controller to control a first portion of preset-color sub-pixels among the plurality of color sub-pixels to display the white grayscale to emit light, a second portion of the preset-color sub-pixels among the plurality of color sub-pixels to display the white gray to not emit light, and remaining ones of the plurality of color sub-pixels to display the black grayscale to not emit light in the standby mode.

2. The display apparatus as claimed in claim 1, wherein the controller is to control a data voltage applied to a preset-color sub-pixel so that the preset color sub-pixel emits light of a high-luminance higher than a normal-luminance corresponding to a white grayscale value in the standby mode.

3. The display apparatus as claimed in claim 1, wherein an emission area of the preset color sub-pixel is the largest among the plurality of color sub-pixels.

4. The display apparatus as claimed in claim 1, wherein the controller is to control the first portion of the preset-color sub-pixels and the second portion of the preset-color sub-pixels to alternately emit light by a preset period in the standby mode.

5. The display apparatus as claimed in claim 1, wherein:
   a first positive power source voltage and a first negative power source voltage are to be applied to the driving transistor in the normal mode, the first positive power source voltage and the first negative power source voltage having a first voltage difference, and
   a second positive power source voltage and a second negative power source voltage are to be applied to the driving transistor in the standby mode, the second positive power source voltage and the second negative power source voltage having a second voltage difference less than the first voltage difference.

6. The display apparatus as claimed in claim 1, wherein the controller is to process normal-resolution image data to low-resolution image data.

7. The display apparatus as claimed in claim 6, wherein:
   a pixel unit of the display includes red, green, and blue sub-pixels, and
   the preset color sub-pixel is the blue sub-pixel.

8. The display apparatus as claimed in claim 7, wherein:
   the low-resolution image data includes image data of a reference pixel unit which corresponds to pixel units arranged in a 1×2 structure, and
   the controller is to control a blue sub-pixel in a first pixel unit, among the pixel units in the 1×2 structure, to emit blue light and to control a blue sub-pixel in a second pixel unit, among the pixel units in the 1×2 structure, to not emit blue light.

9. The display apparatus as claimed in claim 7, wherein:
   the low-resolution image data includes image data of a reference pixel unit which corresponds to pixel units arranged in a 2×2 structure, and
   the controller is to control blue sub-pixels in a first pixel unit and a fourth pixel unit, among the pixel units in the 2×2 structure, to emit blue light and to control blue sub-pixels in a second pixel unit and a third pixel unit, among the pixel units in the 2×2 structure, to not emit blue light, the first and fourth pixel units arranged in a first diagonal direction and the second and third pixel unit arranged in a second diagonal direction crossing the first diagonal direction.

10. The display apparatus as claimed in claim 6, wherein:
a pixel unit of the display includes red, first green, second green, and blue sub-pixels, and
the preset color sub-pixel includes the first and second green sub-pixels.

11. The display apparatus as claimed in claim 10, wherein:
the low-resolution image data includes image data of a reference pixel unit which corresponds to a plurality of pixel units, and
the controller is to control the first green sub-pixel in the reference pixel unit to emit green light and to control the second green sub-pixel in the reference pixel unit to not emit green light.

12. The display apparatus as claimed in claim 1, wherein an emission area of the preset-color sub-pixel is the largest among the plurality of color sub-pixels.

13. A method for driving a display apparatus including a plurality of color sub-pixels, each of the plurality of color sub-pixels including an organic light emitting diode and a driving transistor to drive the organic light emitting diode, the method comprising:
providing a first positive power source voltage and a first negative power source voltage having a first voltage difference to the driving transistor in a normal mode;
providing a second positive power source voltage and a second negative power source voltage having a second voltage difference to the driving transistor in a standby mode in which a standby image is displayed, the standby image including a white grayscale and a black grayscale, the second voltage difference less than the first voltage difference;
emitting light from a first portion of preset-color sub-pixels having the largest emission area among the plurality of color sub-pixels to display the white grayscale in the standby mode;
preventing emission of light from a second portion of the preset-color sub-pixels among the plurality of color sub-pixels to display the white grayscale in the standby mode; and
preventing emission of light from remaining ones of the plurality of color sub-pixels to display the black grayscale in the standby mode.

14. The method as claimed in claim 13, further comprising:
controlling the first portion of the preset-color sub-pixels and the remaining second portion of the preset-color sub-pixels to alternately emit light by a preset period in the standby mode.

15. The method as claimed in claim 14, further comprising:
processing normal-resolution image data to low-resolution image data.

16. The method as claimed in claim 15, wherein:
a pixel unit includes red, green, and blue sub-pixels, and
an emission area of the blue sub-pixel is largest among the plurality of color sub-pixels.

17. The method as claimed in claim 16, wherein:
the low-resolution image data includes image data of a reference pixel unit which corresponds to pixel units arranged in a 1×2 structure, and
the method includes:
controlling a blue sub-pixel in a first pixel unit, among the pixel units in the 1×2 structure to emit blue light, and
controlling a blue sub-pixel in a second pixel unit among the pixel units in the 1×2 structure to not emit blue light.

18. The method as claimed in claim 16, wherein:
the low-resolution image data includes image data of a reference pixel unit which corresponds to pixel units arranged in a 2×2 structure, and the method includes:
controlling blue sub-pixels in a first pixel unit and a fourth pixel unit among the pixel units in the 2×2 structure to emit blue light, and
controlling blue sub-pixels in a second pixel unit and a third pixel unit among the pixel units in the 2×2 structure to not emit blue light, the first and fourth pixel units arranged in a first diagonal direction and the second and third pixel unit arranged on a second diagonal direction crossing the first diagonal direction.

19. The method as claimed in claim 15, wherein:
a pixel unit of the display apparatus includes red, first green, second green, and blue sub-pixels, and
an emission area of the first and second green sub-pixels is the largest among the plurality of color sub-pixels.

20. The method as claimed in claim 19, wherein:
the image data of the low-resolution includes image data of a reference pixel unit which corresponds to a plurality of pixel units, and
the method includes:
controlling the first green sub-pixel in the reference pixel unit to emit green light, and
controlling the second green sub-pixel in the reference pixel unit to not emit green light.

* * * * *